US008281754B2

(12) United States Patent
Saida et al.

(10) Patent No.: US 8,281,754 B2
(45) Date of Patent: Oct. 9, 2012

(54) VEHICLE ENGINE COOLING APPARATUS

(75) Inventors: Yoshitaka Saida, Wako (JP); Choji Sakuma, Wako (JP); Hironori Shuto, Wako (JP); Isao Tsunoda, Wako (JP); Yasuo Minagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 12/570,557

(22) Filed: Sep. 30, 2009

(65) Prior Publication Data

US 2010/0083917 A1    Apr. 8, 2010

(30) Foreign Application Priority Data

Oct. 2, 2008   (JP) ................................. 2008-257114

(51) Int. Cl.
*F01P 7/10*   (2006.01)
*B60K 11/04*   (2006.01)
(52) U.S. Cl. ............... 123/41.04; 123/41.48; 123/41.49; 123/41.51; 180/68.1; 180/68.4
(58) Field of Classification Search ............... 123/41.04, 123/41.48, 41.51, 41.49; 180/68.1, 68.4
See application file for complete search history.

(56) References Cited

U.S. PATENT DOCUMENTS

| 1,390,724 | A | * | 9/1921 | Rumens ........................ 236/35.3 |
| 4,476,820 | A | * | 10/1984 | Nixon ......................... 123/41.05 |
| 4,604,974 | A | * | 8/1986 | Watanabe ................... 123/41.57 |
| 4,723,594 | A | * | 2/1988 | Koehr et al. ..................... 165/44 |
| 4,756,279 | A | * | 7/1988 | Temmesfeld ............... 123/41.04 |
| 4,779,577 | A | * | 10/1988 | Ritter et al. ................. 123/41.05 |
| 4,938,303 | A | * | 7/1990 | Schaal et al. ................. 180/68.1 |
| 4,986,345 | A | * | 1/1991 | Uemura et al. .................. 165/86 |
| 4,995,447 | A | * | 2/1991 | Weidmann et al. ............. 165/44 |
| 5,038,723 | A | * | 8/1991 | Bandlow et al. ........... 123/41.04 |
| 5,205,484 | A | * | 4/1993 | Susa et al. .................... 236/35.3 |
| 5,341,652 | A | * | 8/1994 | Tajiri et al. ...................... 62/244 |
| 5,669,311 | A | * | 9/1997 | Hill et al. ...................... 105/62.2 |
| 6,192,838 | B1 | * | 2/2001 | Matsuo et al. ............. 123/41.01 |
| 6,390,217 | B1 | * | 5/2002 | O'Brien et al. ............. 180/68.6 |
| 6,543,525 | B2 | * | 4/2003 | Kalbacher ...................... 165/140 |
| 7,757,643 | B2 | * | 7/2010 | Harich et al. .............. 123/41.04 |
| 7,784,576 | B2 | * | 8/2010 | Guilfoyle et al. ............ 180/68.1 |
| 2008/0257286 | A1 | * | 10/2008 | Harich et al. .............. 123/41.12 |

FOREIGN PATENT DOCUMENTS

| GB | 2131150 | 6/1984 |
| JP | 59-101530 | 6/1984 |
| JP | 10-272993 | 10/1998 |
| JP | 2002-225573 | 8/2002 |

\* cited by examiner

*Primary Examiner* — Noah Kamen
*Assistant Examiner* — Grant Moubry
(74) *Attorney, Agent, or Firm* — Rankin, Hill & Clark LLP

(57) ABSTRACT

A radiator is provided within an engine room and in front of an engine for cooling engine cooling water. A shutter is provided in front of the radiator and covers a portion of a core surface of the radiator for adjusting an amount of cooling air to be directed toward the radiator. A baffle plate is provided behind a remaining portion of the core surface, which is not covered with the shutter, for directing the air, having passed through the remaining portion, to outside the engine room.

3 Claims, 4 Drawing Sheets

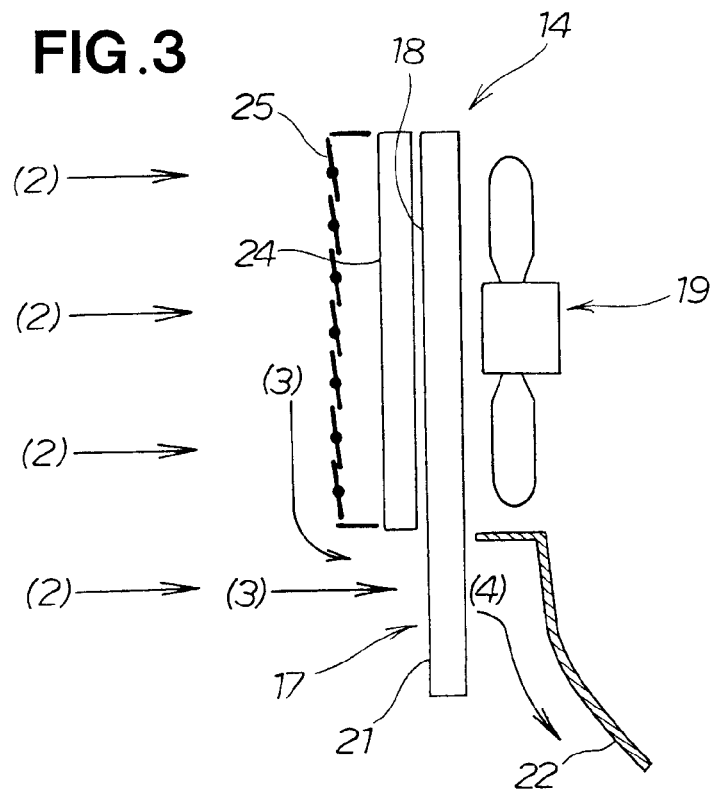
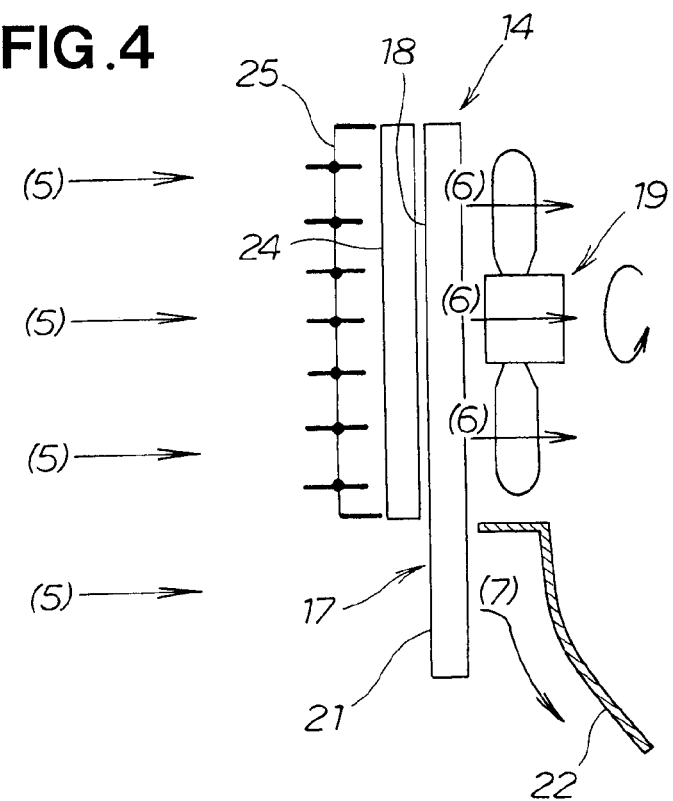

VEHICLE ENGINE COOLING APPARATUS

FIELD OF THE INVENTION

The present invention relates to apparatus for cooling vehicle engines.

BACKGROUND OF THE INVENTION

In automotive vehicles, a radiator is provided in front of an engine, in order to cool cooling water warmed by the engine. The radiator is connected to the engine via a cooling water passageway so that the cooling water flows from the engine into the radiator. The radiator is cooled by air introduced thereinto from outside the vehicle, and thus, the temperature of the cooling water flowing within the radiator is also lowered. Various cooling apparatus for cooling engine cooling water have been proposed, one example of which is disclosed in Japanese Patent Publication No. SHO-63-46245 (JP S63-046245 B).

FIG. 5 is a view explanatory of a basic construction of the vehicle engine cooling apparatus disclosed in JP S63-46245 B. The cooling water warmed by the heat of the engine 101 is directed into the radiator 103 via the cooling water passageway 102. The cooling water thus directed into the radiator 103 is cooled, together with the radiator 103, by air taken in from outside an engine room as indicated by arrow (1). The thus-cooled cooling water is returned to the engine 101 via a cooling water discharge passageway 104 to thereby cool the engine 101.

In such a vehicle engine cooling apparatus, the engine 101 has not been warmed enough and the temperature of the cooling water is still low immediately after activation of the engine 101. Thus, the temperature of the cooling water need not be lowered until the engine 101 is warmed enough. Therefore, in such a case, a shutter 105 provided in front of the radiator 103 is closed to prevent air (indicated by arrow (1) in the figure) from contacting the radiator 103. Thus, the engine 101 is prevented from being cooled, so that the engine 101 can be warmed promptly after the activation. Once the temperature of the engine 101 exceeds a predetermined temperature and a need arises to lower the temperature of the cooling water, the shutter 105 is opened, and thus, the radiator 103 can be subjected to air taken in from outside the engine room so that the temperature of the cooling water can be lowered.

Sometimes, the vehicle is being run (or traveling) in a high-temperature environment for a long time. Under such a condition too, the cooling water for cooling the engine must be cooled sufficiently. For that purpose, a radiator core surface 106 is increased to allow the taken-in air to efficiently contact the radiator 103. Namely, the radiator core surface 106 is formed to have a great area so that it can sufficiently cool the cooling water even when the vehicle is being run in a high-temperature environment.

Because the radiator core surface 106 has a great area, the temperature of the cooling water tends to be rapidly cooled more than necessary if the vehicle is run with the shutter 105 kept opened under normal temperature. Once the cooling water drops below a predetermined temperature, the shutter 105 is closed, and thus, the temperature of the cooling water increases rapidly. Namely, with the vehicle engine cooling apparatus disclosed in JP S63-46245 B, the temperature of the cooling water frequently repeats increase and decrease and thus may become unstable. Stabilization of the cooling water temperature is desirable in that it can keep cooling the engine 101 in a stable manner.

SUMMARY OF THE INVENTION

In view of the foregoing prior art problems, it is an object of the present invention to provide an improved cooling apparatus which can cool a vehicle engine in a stable manner.

In order to accomplish the above-mentioned object, the present invention provides an improved vehicle engine cooling apparatus, which comprises: a radiator disposed within an engine room and in front of an engine for cooling engine cooling water; a shutter disposed in front of the radiator for adjusting an amount of cooling air to be directed toward the radiator, the shutter being disposed so as to cover a portion of a core surface of the radiator; and a baffle plate disposed behind of the remaining portion of the core surface, which is not covered with the shutter, for directing the air, having passed through the remaining portion, to outside the engine room.

With the shutter in the closed position, air taken in from outside the engine room passes through the remaining portion of the core surface which is not covered with the shutter. Thus, when the vehicle is being run (or traveling) in a normal temperature environment, the engine cooling water can be not only sufficiently cooled by just the taken-in air being caused to contact the remaining portion of the radiator core surface but also prevented from being cooled excessively. Thus, the temperature of the cooling water can be stabilized, so that the engine can be cooled in a stable manner.

Preferably, the vehicle engine cooling apparatus further comprises an outside heat exchanger of a heat-pump type air conditioning device disposed between the shutter and the radiator, and the outside heat exchanger has its entire core surface covered with the shutter. When the vehicle is being run in a low temperature environment, the shutter need not be opened and thus is kept closed. With the shutter kept in the closed position like this, the air taken in from outside the engine room is prevented from flowing into the engine room, so that the engine room is not cooled. The outside heat exchanger uses warm air of the engine room. Thus, when the external temperature is low and heating is required, the present invention permits sufficient heating performance without the interior of the engine room being cooled.

Preferably, the vehicle engine cooling apparatus further comprises an air cooling heat exchanger disposed in front of the remaining portion of the core surface of the radiator. In this way, the present invention permits effective use of an empty space.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 3 is a view explanatory of behavior of the embodiment of the vehicle engine cooling apparatus when a shutter is in a closed position and a fan is in an OFF or non-activated state;

FIG. 4 is explanatory of behavior of the embodiment of the vehicle engine cooling apparatus when the shutter is in an opened position and the fan is in an ON or activated state.

DETAILED DESCRIPTION OF THE PREFERRED EMBODIMENTS

Figure 1:
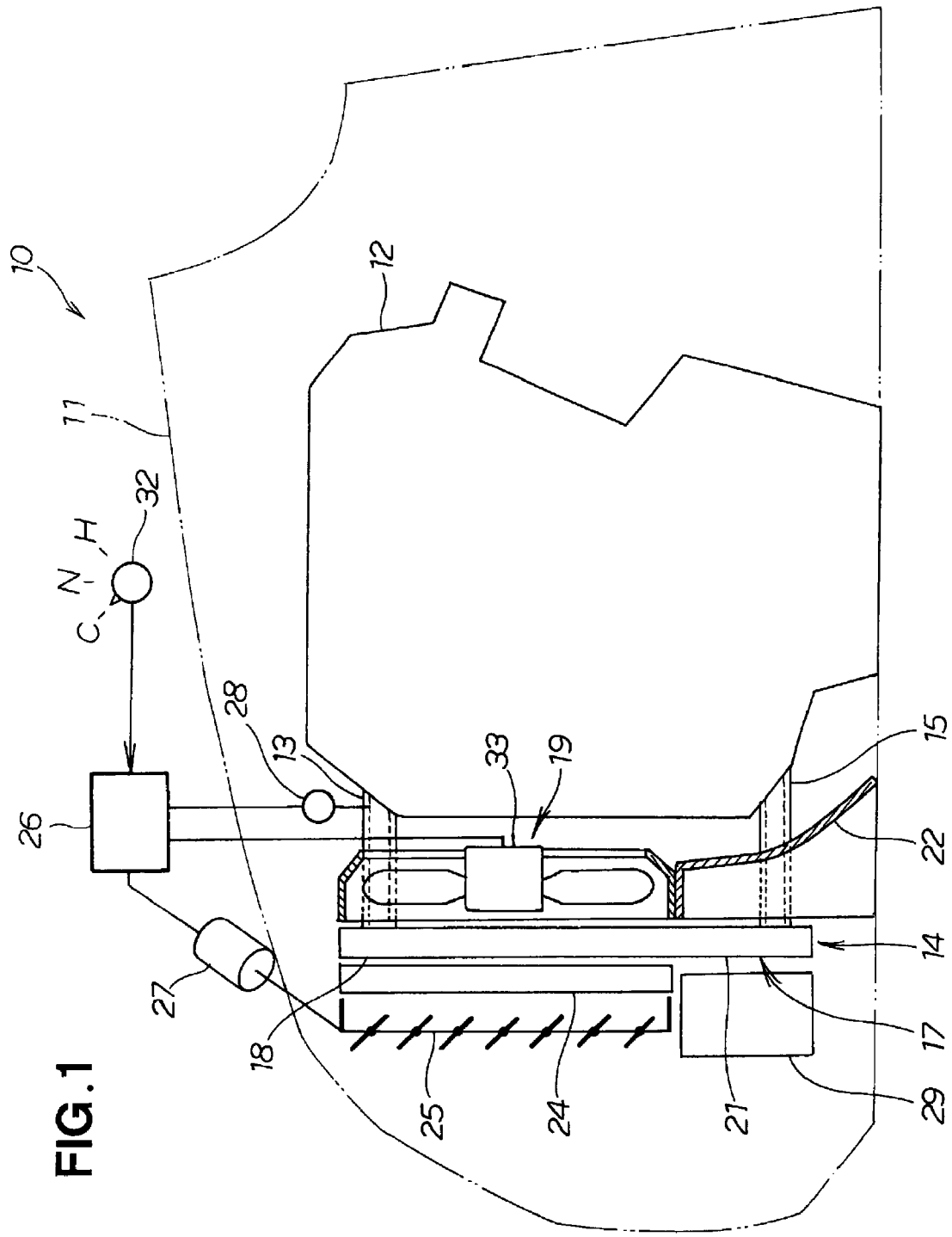
FIG. 1 is a view showing a vehicle engine cooling apparatus according to an embodiment of the present invention.

Reference is now made to FIG. 1 showing a vehicle engine cooling apparatus 10 according to an embodiment of the present invention. This vehicle engine cooling apparatus 10, which is provided for cooling an engine 12 disposed within an engine room 11 indicated by imaginary line, includes: a radiator 14 disposed in front of the engine 12 for cooling engine cooling water introduced thereinto via a cooling water introducing passageway 13; a cooling water discharge passageway 15 connected to the engine 12 for returning the cooling water, cooled by the radiator 14, to the engine 12; a fan 19 disposed in front of the engine 12 and behind a portion 18 of a core surface 17 of the radiator 14; and an air directing plate or baffle plate 22 disposed behind the remaining portion 21 of the core surface 17 of the radiator 14 for directing air, having passed through the remaining portion 21, to outside the engine room 11. The vehicle engine cooling apparatus 10 further includes: an outside heat exchanger 24 of a heat-pump type air conditioning device disposed in front of the one portion 18 of the core surface 17; a shutter 25 disposed in front of the outside heat exchanger 24 for adjusting an amount of air to be directed toward the radiator 14; an actuator 27 connected to the shutter 25 for opening and closing the shutter 25 under control of a control section 26; a water temperature sensor 28 disposed in the cooling water introducing passageway 13 for measuring the temperature of the cooling water introduced from the engine 12 and informing the control section 26 of the measured temperature; and an air cooling heat exchanger 29, such as an intercooler or ATF cooler, disposed in front of the remaining portion 21 of the core surface 17.

Of the above-mentioned component parts, at least the radiator 14, shutter 25 and other components 13, 15, 19, 21, 24, 28, 29 and 33 are disposed within the engine room 11. The outside heat exchanger 24 of the heat-pump type air conditioning device is disposed between the shutter 25, and an entire core surface of the outside heat exchanger 24 is covered with the shutter 25.

Dial 32 disposed in a vehicle compartment for switching between cooling and cooling states or modes is connected to the control section 26 for informing the control section 26 of which one of the cooling, heating and to non-operating states the currently-set state of the cooling apparatus is.

Motor 33 for driving the fan 19 is connected to the control section 26 to be controlled by the control section 26. The control section 26 causes the motor 33 to drive the fan 19 when the shutter 25 is in the opened position.

With the air cooling heat exchanger 29 disposed in front of the remaining portion 21, the instant embodiment permits effective use of an empty space.

The following paragraphs describe behavior of the vehicle engine cooling apparatus constructed in the aforementioned manner.

Figure 2:
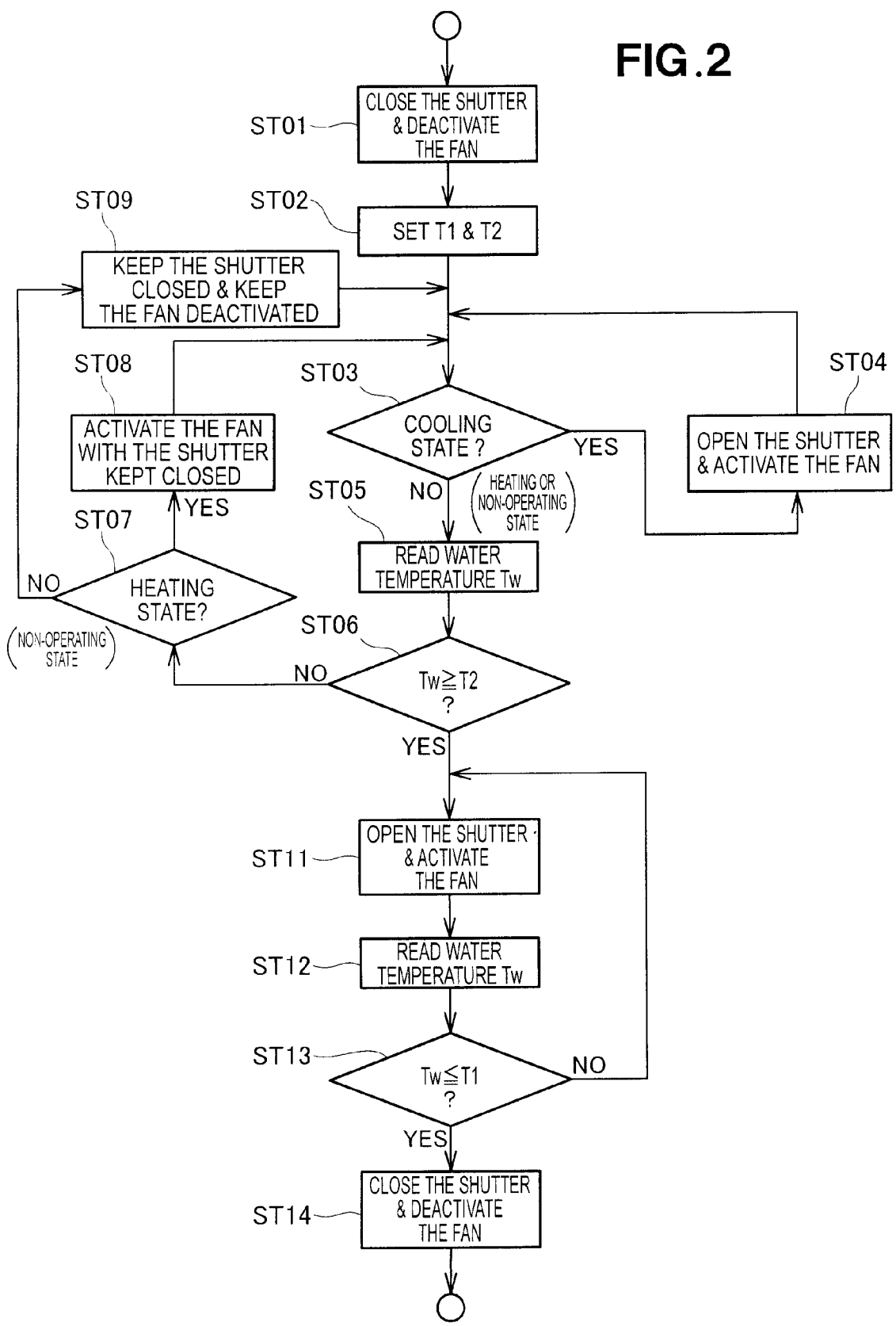
FIG. 2 is a flow chart explanatory of operation of the embodiment of the vehicle engine cooling apparatus.
Figure 5:
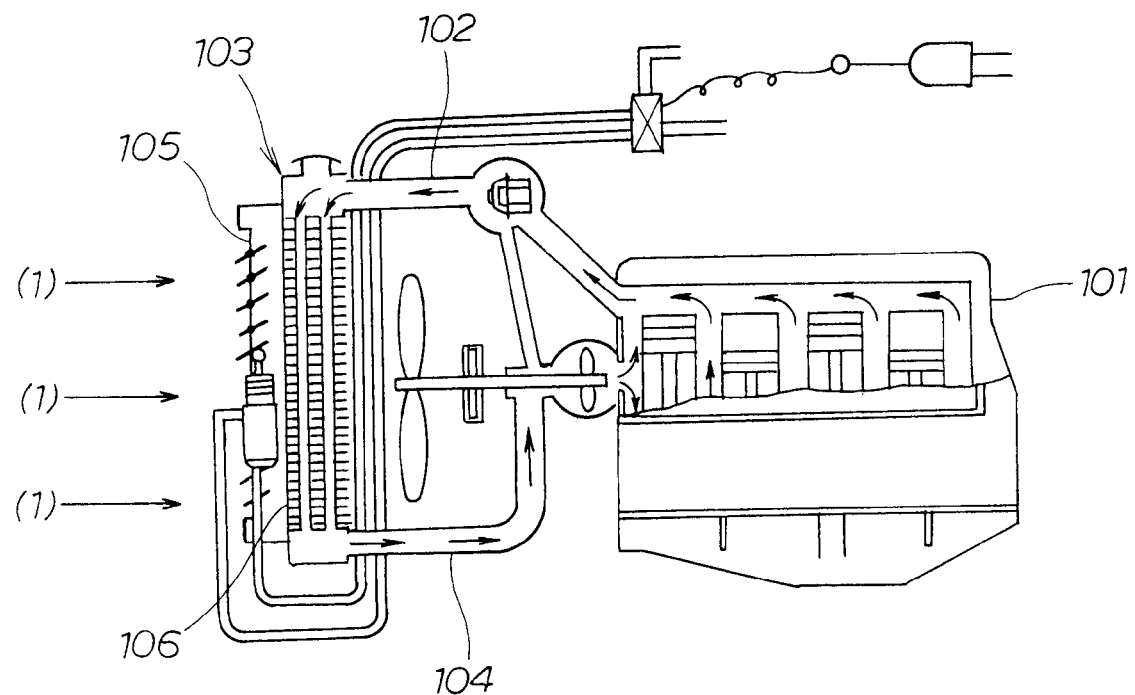
FIG. 5 is a view illustrating a basic construction of a conventional vehicle engine cooling apparatus.

FIG. 2 is a flow chart explanatory of operation of the embodiment of the vehicle engine cooling apparatus 10. At an initialization step ST01, the shutter 25 is closed, and the fan 19 is deactivated.

Then, a first setting temperature (e.g., 80° C.) T1 and a second setting temperature (e.g., 90° C.) T2 higher than the first setting temperature T1 are set at step ST02. Next, the control section 26 determines, at step ST03, as to whether or not the currently-set state of the cooling apparatus is the cooling state. If the dial 32 of FIG. 1 is currently at a "C" position, for example, the control section 26 determines that the currently-set state is the cooling state, so that control goes to step ST04, where the shutter 25 is opened while the fan 19 is turned on or activated. Then, as long as the vehicle is in the cooling state, the shutter 25 is kept in the opened position and the fan 19 is kept in the ON or activated state.

If the currently-set state is not the cooling state as determined at step ST03, i.e. if the currently-set state is the heating state or non-operating state, control proceeds to step ST05, where the control section 26 reads the water temperature Tw detected by the water temperature sensor 28. Then, the control section 26 determines, at step ST06, whether the read water temperature Tw is equal to or higher than the second setting temperature (e.g., 90° C.) T2.

With a NO determination at step ST06, i.e. if the read water temperature Tw is lower than the second temperature T2 as determined at step ST06, control branches to step ST07. If the device is in the heating state or mode at that time, the fan 19 is activated with the shutter 25 kept closed at step ST08, after which control reverts to step ST03. If the device is in the non-operating state at that time, the shutter 25 is kept in the closed position and the fan 19 is kept in the OFF state at step ST09, after which control reverts to step ST03. Activating the fan 19 with the shutter 25 kept closed in the heating state at step ST08 can achieve sufficient heating performance. On the other hand, keeping the fan 19 deactivated with the shutter 25 kept closed in the non-operating state at step ST09 can increase or raise the water temperature Tw.

With a YES determination at step ST06, i.e. if the water temperature Tw is equal to or higher than the setting temperature (e.g., 90° C.) T2 as determined at step ST06, control goes on to step ST11, where the shutter 25 is opened and the fan 19 is activated. Then, the control section 26 reads the water temperature Tw detected by the water temperature sensor 28, at step ST12.

Then, at step ST13, a determination is made as to whether the read water temperature Tw is equal to or lower than the first setting temperature (e.g., 80° C.) T1. With a NO determination at step ST13, i.e. if the water temperature Tw is higher than the first setting temperature T1 as determined at step ST13, control reverts to step ST11. Because the shutter 25 is opened and the fan 19 is activated at step ST11, the water temperature Tw can be lowered.

On the other hand, with a YES determination at step ST13, i.e. if the read water temperature Tw is equal to or lower than the first setting temperature T1 as determined at step ST13, the shutter 25 is closed and the fan 19 is deactivated or turned off at step ST14, after which the flow is brought to an end.

The following describe behavior of the embodiment of the vehicle engine cooling apparatus 10 when the shutter 25 is in the closed position and the fan 19 is in the OFF or non-activated state. FIG. 3 is a view explanatory of behavior of the embodiment of the vehicle engine cooling apparatus 10 when the shutter 25 is in the closed position and the fan 19 is in the OFF state. Air is taken in from outside the engine room 11 (FIG. 1) as indicated by arrow (2), and a portion of the taken-in air having contacted the closed shutter 25 and another portion of the taken-in air having not contacted the closed shutter 25 flow toward the remaining portion 21 of the radiator core surface 17 as indicated by arrow (3). The air having passed through the remaining portion 21 is discharged out of the engine room 11 via the baffle plate 22, as indicated by arrow (4). In this way, the air can be prevented from flowing toward the engine 12, so that the engine 12 can be warmed promptly after activation of the engine 12.

Once the engine 12 is warmed, the cooling water is caused to flow through the radiator 14, so that the cooling water flowing through the radiator 14 is cooled by the air passing through the remaining portion 21.

With the shutter 25 kept in the closed position, the air taken in from outside the engine room 11 passes through the remaining portion 21 of the core surface 17 which is not covered with the shutter 25. Thus, when the vehicle is being run (or traveling) in a normal temperature environment, the cooling water can be not only sufficiently cooled by just the taken-in air being caused to contact the remaining portion 21 of the radiator core surface 17 but also prevented from being cooled excessively. Thus, the temperature of the cooling water can be stabilized, so that the engine 12 can be cooled in a stable manner.

Namely, when the vehicle is being run in a low temperature environment, the shutter 25 need not be opened and thus is kept closed. With the shutter 25 kept in the closed position like this, the air taken in from outside the engine room 11 is prevented from flowing into the engine room 11, so that the engine room 11 is not cooled. The outside heat exchanger 24 uses warm air of the engine room 11. Thus, when the external temperature is low and heating is required, the instant embodiment permits sufficient heating performance without the interior of the engine room being cooled.

The following describe behavior of the embodiment of the vehicle engine cooling apparatus 10 when the shutter 25 is in the opened position and the fan 19 is in the ON or activated state. FIG. 4 is a view explanatory of behavior of the embodiment of the vehicle engine cooling apparatus 10 when the shutter 25 is in the opened position and the fan 19 is in the ON or activated state. Air is taken in from outside the engine room 11 as indicated by arrow (5), and a portion of the taken-in air passes through the shutter 25 and then passes through the portion 18 of the core surface 17 as indicated by arrow (6).

Another portion of the taken-in air, which has not passed through the shutter 25, passes through the remaining portion 21 of the core surface 17 and then discharged out of the engine room 11 as indicated by arrow (7).

Namely, when the vehicle is being run in a high temperature environment for a long time, there is a need to cause a large amount of air to contact the radiator core surface 17, in order to cool the cooling water. Thus, in this case, the shutter 25 is opened to cause a large amount of air to contact the radiator 14 to thereby cool the cooling water.

When the shutter 25 is open as well, the air having passed through the remaining portion 21 of the radiator core surface 17 is discharged out of the engine room via the baffle plate 22. Namely, with the baffle plate 22, the instant embodiment can reduce the amount of air to be taken into the engine room 11 and thereby enhance the aerodynamic performance of the vehicle.

In the above-described embodiment, an upper portion of the radiator core surface 17 is provided as the one portion of the radiator core surface 17 covered with the shutter 25. Alternatively, any other desired portion, such as a lower portion, right portion or left portion, of the radiator core surface 17 may be provided as the one portion of the radiator core surface 17 covered with the shutter 25.

The vehicle engine cooling apparatus of the present invention is well suited for application to four-wheeled vehicles.

What is claimed is:

1. A vehicle engine cooling apparatus comprising: a radiator that cools cooling water of an engine, wherein the radiator is disposed in front of the engine so that the radiator and the engine are located within an engine room; a shutter that adjusts an amount of cooling air that is directed toward the radiator, wherein the shutter is disposed in front of the radiator so as to cover a portion of a core surface of the radiator; and a baffle plate that is disposed behind a remaining portion of the core surface that is not covered with the shutter so as to keep separate the cooling air that has passed through the shutter and taken-in air that has not passed through the shutter, wherein the baffle plate directs the taken-in air that has passed through the remaining portion been kept separate from the cooling air that passed through the shutter, to outside the engine room.

2. The vehicle engine cooling apparatus of claim 1, further comprising an outside heat exchanger of a heat-pump type air conditioning device, wherein the outside heat exchanger is disposed between the shutter and the radiator, and wherein an entire core surface of the outside heat exchanger is covered with the shutter.

3. The vehicle engine cooling apparatus of claim 1, further comprising an air cooling heat exchanger that is disposed in front of the remaining portion of the core surface of the radiator.

* * * * *